Dec. 6, 1960   E. A. OHM   2,963,668
BROAD-BAND ELECTROMAGNETIC WAVE TRANSMISSION MEANS
Filed Dec. 28, 1955

$$(f_1 - f_0) = .15\left(\frac{f_1 + f_0}{2}\right)$$

INVENTOR
E. A. OHM
BY *Roy M. Porter Jr.*

ATTORNEY

United States Patent Office 2,963,668
Patented Dec. 6, 1960

2,963,668

BROAD-BAND ELECTROMAGNETIC WAVE TRANSMISSION MEANS

Edward A. Ohm, Shrewsbury, N.J., assignor to Bell Telephone Laboratories, Incorporated, New York, N.Y., a corporation of New York Filed Dec. 28, 1955, Ser. No. 555,855

3 Claims. (Cl. 333—98)

This invention relates to microwave transmission systems and more particularly to the use of gyromagnetic components for operation over a wide frequency range in said systems.

After the discovery of the unique properties exhibited by gyromagnetic material subject to applied direct-current magnetic biasing fields, numerous and important developments in the field of radio transmission have rapidly developed. For example, Faraday rotators have been applied at microwave frequencies as components of isolators, modulators, attenuators, circulators, phase changers, etc.

Although various of these gyromagnetic devices have been subjected to considerable experimental scrutiny and have been employed in numerous operative experimental situations, thus far only a few of these revolutionary devices have appeared in commercial use. A major reason for this non-utilization in the commercial scene is the fact that these gyromagnetic devices when employed in wave guides are frequency dependent. Therefore, they have been commercially unsuitable for certain of the categories of communication systems which operate over broad bands of frequencies.

It is an object of the invention, therefore, to compensate for the frequency dependency of gyromagnetic material in electromagnetic wave devices.

There is a group of gyromagnetic devices which is characterized by an elongated element of gyromagnetic material, usually ferrite, loaded in a round metallic wave guide and subject to an applied direct-current magnetic biasing field. The Faraday rotator is in this group and has its applied magnetic field directed parallel to the longitudinal axis of the ferrite. As is the case with all gyromagnetic devices in which the guide is partially loaded, the Faraday rotator is frequency dependent. In the Faraday rotator, the angle of rotation of the plane of polarization of electromagnetic energy transmitted through a given Faraday element increases with frequency. This frequency dependence renders operation of the various applications of the Faraday rotator inefficient when these components are operated over a wide frequency band.

It is, therefore, a specific object of the invention to provide electromagnetic wave polarization rotation of a constant value in a transmission system operating over a wide frequency band.

The reason for the frequency dependence of Faraday rotators is well known. When an element of ferrite material, partially filling a wave guide, is excited by R.-F. wave energy, the wave energy is distributed between the ferrite element and the low dielectric constant medium in the wave guide surrounding it. When the frequency of the wave energy is increased, a redistribution of energy between the element and the dielectric medium surrounding it takes place; with a higher concentration of energy appearing in the ferrite element and a concomitant decrease in concentration of energy occurring in the surrounding medium. For a given increase in frequency, the amount of additional energy concentrated in the gyromagnetic element depends upon the dielectric constants of the element and the medium, relative to each other. Specifically the greater the dielectric constant of the element relative to that of the medium, the greater the increase in energy concentration therein. Now, the rotation effect provided by this device depends upon the ferrite element exhibiting two different permeabilities, respectively, to components of the wave energy. As a consequence, the wave components are propagated at different phase velocities and upon emergence from the element recombine in a new phase relationship which appears as a rotation of the plane of polarization in the Faraday rotator. When more of the energy is concentrated in the ferrite element due to an increase in frequency, the difference between the two permeabilities is increased. As a consequence, rotation is likewise increased.

It has been discovered that this redistribution of energy with change in frequency can be avoided by a novel type of loading of the wave guide with dielectric material. In a Faraday rotator, for example, with an elongated ferrite element partially filling a round metallic guide, the loading takes the form of a cylinder of dielectric material concentric to both the ferrite element and the round guide. The outside surface of the dielectric cylinder is contiguous to the inside guide wall and its inside surface is separated from the ferrite element by air or by some dielectric material having a dielectric constant substantially less than that of the cylinder and the ferrite. In this arrangement the redistribution of energy due to an increase in frequency takes a new form. The energy which previously would tend to be displaced from the air or intermediate low dielectric constant medium into the ferrite is now redistributed substantially completely in the dielectric cylinder. Thereby the energy concentration in the ferrite may remain substantially the same as at the lower frequency. The dielectric cylinder having a dielectric constant substantially greater than air or greater than the intermediate dielectric medium, may be proportioned relative to the size of the ferrite to provide any one of a large family of frequency response curves. In particular, a completely flat frequency response over a 15 percent band width can be achieved with negligible insertion loss.

One of the most attractive features of the invention is the simplicity of the structures embodying it, e.g., no complicated structures need be added to a Faraday rotator.

These and other objects and features of the present invention, the nature of the invention and its advantages will appear more fully upon consideration of the specific illustrative embodiment shown in the accompanying drawings and in the following detailed description.

Figure 1:
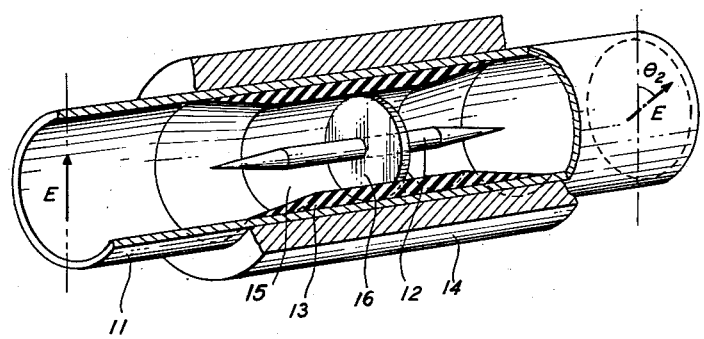
Fig. 1 is a perspective view of a broad band electromagnetic wave polarization rotator in accordance with the invention.

In more detail, Fig. 1 is an embodiment of a polarization rotator in accordance with the invention, given by way of example for purposes of illustration, comprising a round wave guide 11 of the metallic shield type proportioned to support linearly polarized electromagnetic waves and preferably dimensioned so that only the various polarizations of the dominant $TE_{11}$ mode can be propagated. Interposed longitudinally in, and partially filling, guide 11 along its axis is an elongated element 12 of ferrite material.

Ferrites are gyromagnetic materials, well known in the art, which when biased by a longitudinal magnetic field introduce a rotation of the plane of polarization to wave energy transmitted therethrough; the magnitude of rotation being dependent upon the particular composition of the ferrite involved, its diameter, length and strength of the applied biasing field. Each end of ferrite element 12 may be tapered in a right conical fashion well known in the art to decrease reflections of wave energy incident upon element 12. Circumscribing and concentric to ferrite 12 is a hollow cylinder 13 of dielectric material having a dielectric constant greater than air. The outside surface of cylinder 13 is contiguous to the inside surface of wave guide 11. In manner well known in the art, element 12 is mounted in this structure through a dielectric spacing washer 16 of polyfoam or other suitable material. The inside surface of cylinder 13 is separated from ferrite 12 so that an air space 15 exists between ferrite 12 and cylinder 13 of a constant radial distance. The extreme ends of the inside surface of hollow cylinder 13 flare outwardly toward the inside surface of guide 11, thereby providing a taper of the type well known in the art for decreasing reflections of wave energy incident upon cylinder 13. Circumscribing wave guide 11 in the region of ferrite 12 and concentric thereto is a permanent magnet which may be composed, for example, of Alnico V. In this arrangement, magnet 14 serves to longitudinally bias ferrite 12 with a constant magnetic field. Magnet 14 has a strength sufficient to saturate ferrite 12.

In the ordinary operation of a Faraday rotator, that is, with dielectric cylinder 13 absent, a plane polarized wave of frequency $f_0$ incident upon a magnetically biased ferrite comprises two component waves in the ferrite, with each of the component waves being circularly polarized in a sense opposite to that of the other. The biased ferrite exhibits respectively different permeabilities to each of the oppositely polarized component waves. As a consequence one of the component waves has a smaller phase velocity than the other and the two component waves are propagated through the ferrite medium at unequal speeds. Upon emergence from the medium the component waves combine to reform a resultant plane polarized wave which is in general polarized at a different angle $\theta_0$ from the original wave due to the phase difference between the component waves introduced during propagation through the ferrite. A wave of frequency $f_1$ greater than $f_0$ will have its plane of polarization rotated by an angle $\theta_1$, greater than $\theta_0$. This is a result of the peculiar wave guiding properties of the ferrite in the wave guide. At frequency $f_0$ a certain portion of the R-F wave energy is propagated through the ferrite element itself with the rest of it propagating in the air space between the ferrite and the wave guide wall. At the higher frequency $f_1$, a greater proportion of the R-F wave energy is concentrated in the ferrite during its propagation therethrough than was the case at $f_0$. As a consequence, the aforementioned anisotropic permeability property of the ferrite is enhanced and the difference between the permeabilities exhibited respectively to the two component waves is increased. Upon emergence from the ferrite, therefore, the two component waves have a greater phase difference between them at $f_1$ than they do at $f_0$ and a greater angle of rotation is thereby evident.

In the operation of the embodiment of Fig. 1 the angle of rotation of the plane of polarization of the R-F wave remains constant over the frequency range from $f_0$ to $f_1$, where $f_1$ minus $f_0$ is 15 percent of the mid-band frequency. At a frequency $f_0$, R-F energy is distributed between ferrite 12, dielectric cylinder 13 and the air space 15 located therebetween. The magnitude of the rotation provided may be, for example $\theta_2$. At a frequency greater than $f_0$, for example $f_1$, that portion of the R-F wave energy distributed in air space 15 which would ordinarily redistribute itself in element 12 (with dielectric cylinder 13 absent), will now be shunted toward, and concentrate itself in, dielectric cylinder 13. Consequently the energy distributed in ferrite element 12 remains constant with frequency variation. This, of course, results in ferrite element 12 affecting the R-F wave energy propagated therethrough in the same manner and to the same extent as was the case at the lower frequency $f_0$. Therefore, the angle of rotation evident upon the R-F wave energy emergent from ferrite 12 is still $\theta_2$.

Figure 2:
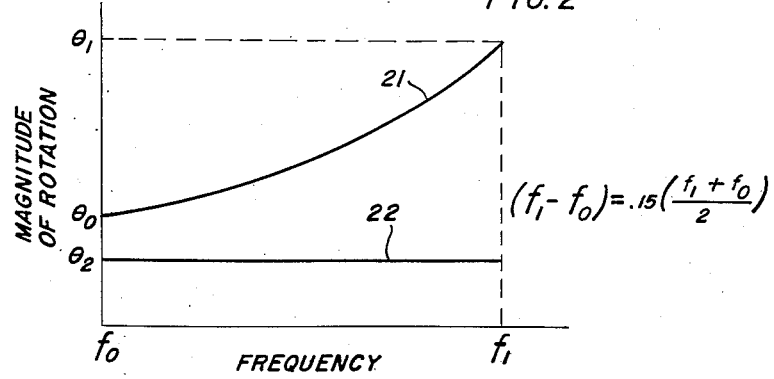
Fig. 2 is a graphical representation, given for the purpose of explanation, of the rotation versus frequency characteristics of a polarization rotator as they would appear respectively with and without the inventive concept.

This effect is graphically portrayed in Fig. 2. The abscissa represents frequency and the ordinate the magnitude of polarization rotation. Curve 21 represents the usual rotation versus frequency response in a Faraday rotator not employing dielectric cylinder 13. It may be noted that this curve is not only non-linear but has an exponential component. Clearly, this type of response in a Faraday rotator employed in a device requiring a constant response over a wide frequency band would render the device effectively inoperative. Note, however, curve 22 which is the rotation versus frequency response of the embodiment of Fig. 1 employing dielectric cylinder 13 in accordance with the invention. This curve is substantially flat over the 15 percent frequency band.

In one of several successful reductions to practice, a Faraday rotator exhibited a substantially constant 41-degree rotation from 10.4 K mc. to 12.0 K mc. with a .19 db insertion loss. In this reduction to practice the ferrite element was 5 inches long (including 1 inch conical tapers) and .123 inch in diameter. The dielectric cylinder was of polystyrene with relative dielectric constant equal to 2.55 and having an inside diameter of .300 inch. The cylinder was coextensive with the ferrite.

The invention is in no wise limited to producing solely a flat frequency response. By proportioning the dimensions of the dielectric cylinder 13 relative to ferrite element 12 and by selecting the dielectric constant of the cylinder appropriately, any one of a large family of frequency response curves may be obtained over a broad band. Variation in these parameters serves to vary the relative distribution of R-F energy between the ferrite element and the dielectric cylinder and accordingly will vary the frequency response (keeping in mind, as stated above, that the greater the relative dielectric constant of the material the greater the relative concentration of R-F energy therein). Indeed, a negative slope was obtained in one reduction to practice. This indicates that not only was energy from the air space diverted to the dielectric cylinder but actually the ferrite element itself gave up a portion of R-F wave energy to the surrounding medium. The flexibility of the invention therefore is apparent.

Figure 3:
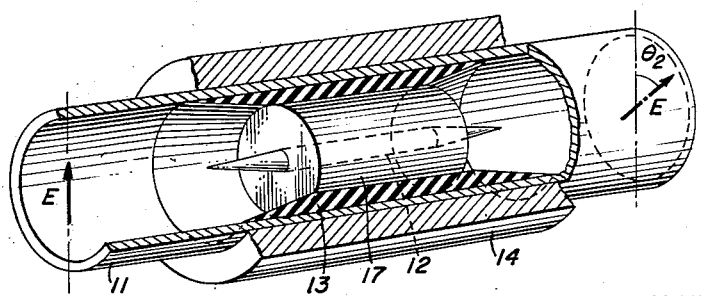
Fig. 3 is a modification of the embodiment of Fig. 1 including an elongated dielectric cylinder of low dielectric constant physically supporting the rotator.

Although the region intermediate of ferrite 12 and dielectric cylinder 13 was represented in Fig. 1 as being filled mainly with air any dielectric material having a dielectric constant substantially less than both ferrite 12 and cylinder 13 could replace the air space. For example, polyfoam which has a relative dielectric constant of 1.05, may be appropriately substituted for the air space, as shown in Fig. 3 wherein polyfoam cylinder 17 surrounds and supports element 12. Now, it is known that the higher the relative dielectric constant of cylinder 13 the greater the insertion loss will be. The insertion loss reported in the above-mentioned reduction to practice is indeed negligible; however, an even smaller loss may be obtained by substituting materials such as fused quartz (having a relative dielectric constant of 3.78) which has a smaller loss tangent than even a dielectric material such as polystyrene, which has a relative dielectric constant of 2.55.

Thus far the major part of the discussion of the invention has been centered about its application to a Faraday rotator. However, it will be apparent to those skilled in the art that any gyromagnetic device, whose frequency dependence results from the above-mentioned increased concentration of energy in the gyromagnetic material, is susceptible to the advantages that application of the invention would provide. By way of additional illustration, the invention may be readily applied in a gyromagnetic differential phase shifter. This would take the same structural form as the embodiment of Fig. 1 except that the biasing magnet would be oriented so as to provide a transverse magnetic field.

In all cases it is understood that the above-described arrangements are simply illustrative of many possible specific embodiments which can represent applications of the principles of the invention. Numerous and varied other arrangements can readily be devised in accordance with said principles by those skilled in the art without departing from the spirit and scope of the invention.

What is claimed is:

1. In combination a section of conductively bounded wave guide of circular cross section, a longitudinally extending rod of material exhibiting gyromagnetic effects at the frequency of said wave energy axially disposed in said wave guide and magnetically biased longitudinally, means for applying linearly polarized electromagnetic wave energy to said guide for producing a Faraday effect rotation, and means for maintaining the concentration of wave energy in the region surrounding said element substantially constant over a broad band of frequencies of said wave energy including a hollow cylinder of material of high dielectric constant and substantially unity permeability constant surrounding said gyromagnetic element and separated therefrom by a cylindrical region of material of low dielectric constant and substantially unity permeability constant having a dielectric constant small enough with respect to said high dielectric constant and a radial dimension large enough with respect to the radial dimension of said cylinder of high dielectric constant material that the decrease of energy concentration with increase in frequency in said low dielectric constant region substantially equals the increase of energy concentration with increase in frequency in said high dielectric constant cylinder.

2. In combination a section of conductively bounded wave guide of circular cross section, a longitudinally extending rod of given diameter of material exhibiting gyromagnetic effects at the frequency of said wave energy axially disposed in said wave guide and magnetically biased longitudinally, means for applying linearly polarized electromagnetic wave energy to said guide for producing a Faraday effect rotation, and means for decreasing change in the concentration of wave energy in the region surrounding said element over a broad band of frequencies of said wave energy including a hollow cylinder of material of high dielectric constant and substantially unity permeability constant surrounding said gyromagnetic element and separated therefrom by a cylindrical region of material of low dielectric constant and substantially unity permeability constant having a dielectric constant small enough with respect to said high dielectric constant and an outside diameter that is at least twice said given diameter of said rod so that the decrease of energy concentration with increase in frequency in said low dielectric constant region substantially compensates the increase of energy concentration with increase in frequency in said high dielectric constant cylinder.

3. In combination a section of conductively bounded wave guide of circular cross section, a longitudinally extending rod of material exhibiting gyromagnetic effects at the frequency of said wave energy axially disposed in said wave guide and magnetically biased longitudinally, means for applying linearly polarized electromagnetic wave energy to said guide for producing a Faraday effect rotation, and means for decreasing change in the concentration of wave energy in the region surrounding said element over a broad band of frequencies of said wave energy including a hollow cylinder of material of high dielectric constant and substantially unity permeability constant surrounding said gyromagnetic element and separated therefrom by a cylindrical air filled region of low dielectric constant and substantially unity permeability constant having a dielectric constant small enough with respect to said high dielectric constant and a radial dimension large enough with respect to the radial dimension of said cylinder of high dielectric constant material that the decrease of energy concentration with increase in frequency in said low dielectric constant region substantially compensates the increase of energy concentration with increase in frequency in said high dielectric constant cylinder.

References Cited in the file of this patent

UNITED STATES PATENTS

| | | |
|---|---|---|
| 2,511,610 | Wheeler | June 13, 1950 |
| 2,645,758 | Van de Lindt | July 14, 1953 |
| 2,719,274 | Luhrs | Sept. 27, 1955 |
| 2,790,149 | Robertson-Shersby-Harvie et al. | Apr. 23, 1957 |
| 2,802,183 | Read | Aug. 6, 1957 |
| 2,820,720 | Iversen | Jan. 21, 1958 |
| 2,846,655 | Iversen | Aug. 5, 1958 |
| 2,849,684 | Miller | Aug. 26, 1958 |

FOREIGN PATENTS

| | | |
|---|---|---|
| 1,089,421 | France | Sept. 29, 1954 |

OTHER REFERENCES

Schlicke: Journal of Applied Physics, vol. 24, No. 2, February 1953, pages 187–191.

Fox et al.: Bell System Technical Journal, vol. 34, No. 1, January 1955, pages 31–32.

Ohm: "IRE Transactions on Microwave Theory and Techniques," October 1956, pages 210–217.